US009526118B2

(12) United States Patent
Cho et al.

(10) Patent No.: US 9,526,118 B2
(45) Date of Patent: Dec. 20, 2016

(54) SYSTEM AND METHOD FOR CONTROLLING PRIORITY-BASED CONTENTION PERIOD CHANNEL ACCESS FOR REDUCING COMPLEXITY IN WBAN MAC PROTOCOL

(71) Applicant: UNIVERSITY-INDUSTRY COOPERATION GROUP OF KYUNG HEE UNIVERSITY, Gyeonggi-do (KR)

(72) Inventors: Jinsung Cho, Gyeonggi-do (KR); Beom-Seok Kim, Gyeonggi-do (KR)

(73) Assignee: University-Industry Cooperation Group of Kyung Hee University, Gyeonggi-do (KR)

( * ) Notice: Subject to any disclaimer, the term of this patent is extended or adjusted under 35 U.S.C. 154(b) by 81 days.

(21) Appl. No.: 14/406,740

(22) PCT Filed: Nov. 16, 2012

(86) PCT No.: PCT/KR2012/009728
§ 371 (c)(1),
(2) Date: Dec. 9, 2014

(87) PCT Pub. No.: WO2013/187563
PCT Pub. Date: Dec. 19, 2013

(65) Prior Publication Data
US 2015/0189679 A1    Jul. 2, 2015

(30) Foreign Application Priority Data
Jun. 13, 2012 (KR) .................... 10-2012-0063398

(51) Int. Cl.
*H04W 4/00* (2009.01)
*H04W 74/08* (2009.01)
(Continued)

(52) U.S. Cl.
CPC ....... *H04W 74/0875* (2013.01); *H04B 13/005* (2013.01); *H04L 43/0858* (2013.01)

(58) Field of Classification Search
None
See application file for complete search history.

(56) References Cited

U.S. PATENT DOCUMENTS

2007/0086471 A1* 4/2007 Igarashi ................ H04W 72/10
370/412
2012/0082036 A1* 4/2012 Abedi ................... H04W 84/18
370/241

FOREIGN PATENT DOCUMENTS

KR  10-2003-0012216 A   2/2003
KR  1012004-0019405 A   3/2004
KR  10-2004-0098919 A   11/2004

OTHER PUBLICATIONS

International Search Report for PCT/KR2012/009728, mailed on Feb. 22, 2013.

* cited by examiner

*Primary Examiner* — Chi H Pham
*Assistant Examiner* — Fahmida Chowdhury
(74) *Attorney, Agent, or Firm* — Kinney & Lange, P.A.

(57) ABSTRACT

The present invention relates to a method and system for controlling contention period channel access, and in particular, to a system and method for controlling priority-based contention period channel access for reducing complexity in a WBAN MAC protocol which grants levels according to the importance of data and preferentially transmits data in a next beacon period having higher levels than data, the transmission of which was delayed in a previous beacon period. The present invention is supported by: a national research and development project, unique number 2011-0015744, with a research period of Jun. 1, 2011 to May 31,
(Continued)

2014; a WBAN core algorithm research project for an efficient smart medical space as a basic research project/staff researcher support project/core research support project supervised by the Ministry of Education, Science and Technology, unique project number NIPA-2011-(C1090-1121-0003), with a research period of Nov. 1, 2006 to Dec. 31, 2014; and an oriental and western new medical u-Life Care technology research project for a university IT research center promotion and support project supervised by the Ministry of Knowledge and Economy.

8 Claims, 6 Drawing Sheets

(51) Int. Cl.
*H04B 13/00* (2006.01)
*H04L 12/26* (2006.01)

Fig. 3

| Algorithm for coordinator |
|---|

Start of Superframe 1. while(!EndOfSuperframe)
2.   SumOfDelay[l] += PacketDelay
3.   CountOfReceivedPkt[l]++
4. end of while
5. 
6. for(i=0;i<3;i++)
7.   if(SumOfDelay[i]/CountOfReceivedPkt >= t[l])
8.     offset[l] = CountOfReciedPkt[i]/CountOfReceivedPkt
9.   end of if
10. end of for
11. 
12. insert offset[l] into Beacon message
13. broadcast Beacon message

Fig. 4

| Algorithm for node |
|---|
| Start of Superframe |

```
1.  delayL = 0
2.
3.  receive Beacon message
4.
5.  if(Packet arrive from upper layer)
6.    for(i = 0 to PacketLevel+1)
7.      delayL += Beacon.offset[i]
8.    end of for
9.    delay(delayL)
10.   operate Slotted-CSMA/CA
11. end of if
```

SYSTEM AND METHOD FOR CONTROLLING PRIORITY-BASED CONTENTION PERIOD CHANNEL ACCESS FOR REDUCING COMPLEXITY IN WBAN MAC PROTOCOL

TECHNICAL FIELD

The present invention relates to a method and system for controlling contention period channel access, and in particular, to a system and method for controlling priority-based contention period channel access for reducing complexity in the WBAN MAC protocol wherein levels are assigned to data according to their importance and data having a level higher than or equal to that of data delayed in the previous beacon period is transmitted first in the next beacon period.

BACKGROUND ART

In recent years, healthcare services and life care services have attracted much attention. A Wireless Body Area Network (hereinafter referred to as WBAN) capable of supporting both medical and consumer electronics (hereinafter referred to as CE) services has become the next generation wireless technology for wireless personal area networks (WPAN). A WBAN composed of a coordinator, medical devices and CE devices may provide various services in medical and non-medical domains. At the early stage of WBAN development, the IEEE 802.15.4 protocol, which is a representative low-power protocol for WPANs, was considered for WBAN services. The reason for considering IEEE 802.15.4 for WBAN is that IEEE 802.15.4 provides low data rate, narrow transmission range and low power consumption, which are common to the requirements of IEEE 802.15.6 The IEEE 802.15.4 media access control (MAC) protocol provides three modes of frame structure such as beacon-enabled superframe, beacon-enabled non-superframe and non-beacon mode. In IEEE 802.15.4, both beacon-enabled non-superframe mode and non-beacon mode operate only on a contention basis. Meanwhile, IEEE 802.15.4 with beacon-enabled superframe mode includes an active period and inactive period. The active period is divided into 16 equal-sized slots, and includes a contention-free period (CFP) and contention-access period (CAP). In particular, the inactive period may be used to reduce power consumption. However, as IEEE 802.15.4 with beacon-enabled superframe mode requires additional time synchronization overhead, only IEEE 802.15.4 with both beacon-enabled non-superframe and non-beacon mode is actually used in the field.

Meanwhile, the IEEE 802.15.6 task group has established WBAN standardization. The objective of the IEEE 802.15.6 task group is to standardize the PHY and MAC protocols for WBANs, which can provide various ubiquitous services. According to the draft document published in March of 2011 by the IEEE 802.15.6 task group, to provide the PHY layer, the WBAN MAC protocol has a hybrid superframe-based structure composed of CAPs and CFPs. We focus on channel access in the CAP because only contention-based channel access is actually used in the field, similarly to the case of IEEE 802.15.4.

In general, the CAP consumes more energy than the CFP because nodes operate on a contention basis. However, as described above, the CFP is not used in the field. Focusing on the CAP, we can consider the following scenario. When many nodes are densely deployed in a narrow region, contention complexity is increased, resulting in high power consumption and numerous collisions. Particularly, in a WBAN environment requiring ultra-low power consumption, low contention complexity can help to reduce power consumption. One WBAN should have up to 256 nodes within 3 to 5 meters of the human body, and up to 10 WBANs must coexist in a space of 6×6×6 $m^3$ with fair bandwidth sharing. In this sense, contention complexity, the number of collisions and power consumption should be increased. Therefore, contention complexity of WBAN is one of the most important keys to satisfaction of WBAN requirements.

Meanwhile, the WBAN draft document provides eight priorities for various packets such as background, best effort, excellent effort, video, voice, medical data or network control, high-priority medical data or network control, emergency or medical event report. To satisfy QoS requirements of WBANs, each priority has distinct maximum/minimum contention windows and contention probability values to realize priority-based channel access.

However, like IEEE 802.11, WBAN contention complexity may cause numerous collisions and more power consumption because up to 256 nodes can join a single WBAN and nodes are densely deployed in a narrow region. Therefore, the priority-based channel access policy defined in the WBAN draft document may also fail to resolve the fundamental contention complexity problem.

DISCLOSURE

Technical Problem

It is an aspect of the present invention to provide a system and method that control priority-based contention period channel access so as to reduce complexity in the WBAN MAC protocol.

Technical Solution

In accordance with one aspect of the present invention, a system for controlling channel access in a priority-based contention period to reduce complexity in a WBAN MAC protocol performing contention-based communication using beacons, wherein the system includes a coordinator that classifies packets received from communication devices according to priority levels, identifies the delay of packets transmitted in the previous beacon period, and grants transmission priority for the next beacon period to a device having a priority higher than or equal to that of a delayed packet.

The coordinator may include: a level classification module to classify priorities of packets; a delay check module to identify packet transmission delay in the previous beacon period; a priority assignment module to assign priorities to packets for channel access at individual sub-periods constituting the whole contention period; and an offset module to specify end points of the sub-periods.

The packets may include emergency packets, medical packets, medical/CE packets and CE packets. Emergency packets are classified as level 0 by the level classification module, medical packets are classified as level 1, medical/CE packets are classified as level 2, and CE packets are classified as level 3. Level 0 has a higher priority than level 1, level 1 has a higher priority than level 2, and level 2 has a higher priority than level 3.

The delay check module may check packet delay by computing the average delay time for packets with level 1 ($D_{avg}^{1}$), and the average delay time is given by $$D_{avg}^l = \left(\sum_{k=0}^{i} D_k^l\right) / N^l$$

where l denotes the level of packets, $D_k^l$ denotes delay of each packet, and $N^l$ denotes the number of packets with level 1.

The delay check module may examine transmission delay by comparing the average delay time with the delay threshold for a given level ($\tau^l$), and the delay threshold for level 0, level 1 and level 2 may be 125 ms and the delay threshold for level 3 may be 250 ms.

The priority assignment module may assign priority so that a sub-period is allocated first to a packet with a level exceeding the delay threshold ($\tau^l$). At a given sub-period, channel access may be allowed only for the level corresponding to the given sub-period and a level having a higher priority than the corresponding level. The sub-periods may be arranged in order of priorities.

The offset module may specify the end point of each sub-period defined by the priority assignment module by computing an offset for level 1 (offset$^l$), and the offset is given by $$\text{offset}^l = \sum_{k=0}^{l-1} \text{offset}^l + L_{CAP}(N^l/N_{total})$$

where $L_{CAP}$ denotes the length of the CAP, $N^l$ denotes the number of packets with level 1, and $N_{total}$ denotes the total number of packets in a superframe.

In accordance with another aspect of the present invention, a method for controlling channel access in a priority-based contention period to reduce complexity in a WBAN MAC protocol. The method may include: classifying, by a level classification module of a coordinator, packets into levels according to their priority; checking, by a delay check module of the coordinator, packet transmission delay by computing the average delay time for each level at each beacon period; dividing, by a priority assignment module of the coordinator, the whole contention period into sub-periods and giving transmission preference at a sub-period of the next beacon to a packet with a level exceeding the level of a delayed packet; and specifying, by an offset module of the coordinator, the end point of each sub-period defined by the priority assignment module.

The packets may include emergency packets, medical packets, medical/CE packets and CE packets. Emergency packets are classified as level 0 by the level classification module, medical packets are classified as level 1, medical/CE packets are classified as level 2, and CE packets are classified as level 3. Level 0 has a higher priority than level 1, level 1 has a higher priority than level 2, and level 2 has a higher priority than level 3.

The average delay time for level 1 ($D_{avg}^l$) is given by $$D_{avg}^l = \left(\sum_{k=0}^{i} D_k^l\right) / N^l$$

where l denotes the level of packets, $D_k^l$ denotes delay of each packet, and $N^l$ denotes the number of packets with level 1.

In checking packet transmission delay, the delay check module may compare the average delay time with the delay threshold for a given level ($\tau^l$), where the delay threshold for level 0, level 1 and level 2 may be 125 ms and the delay threshold for level 3 may be 250 ms.

In dividing the whole contention period into sub-periods and giving transmission preference, the priority assignment module may assign priority so that a sub-period is allocated first to a packet with a level exceeding the delay threshold ($\tau^l$). At a given sub-period, channel access may be allowed only for the level corresponding to the given sub-period and a level having a higher priority than the corresponding level. The sub-periods may be arranged in order of priority.

In specifying the end point of each sub-period, the offset module may specify the end point of each sub-period defined by the priority assignment module by computing an offset for level 1 (offset$^l$). The offset is given by $$\text{offset}^l = \sum_{k=0}^{l-1} \text{offset}^l + L_{CAP}(N^l/N_{total})$$

where $L_{CAP}$ denotes the length of the CAP, $N^l$ denotes the number of packets with level 1, and $N_{total}$ denotes the total number of packets in a superframe.

Advantageous Effects

In the present invention, the contention period is divided into priority-based sub-periods and priorities for channel access are assigned to the individual sub-periods. As such, it is possible to disperse nodes making channel access attempts at the same time, thereby reducing transmission delay, power consumption, and collision ratios.

In addition, the present invention may heighten portability of a wireless network employing a contention-based channel access scheme.

DESCRIPTION OF DRAWINGS

FIG. 3 is a pseudo code for the coordinator in the system that controls priority-based contention period channel access for complexity reduction in the WBAN MAC protocol according to the present invention.

FIG. 4 is a pseudo code for a node in the system that controls priority-based contention period channel access for complexity reduction in the WBAN MAC protocol according to the present invention.

Figure 1:
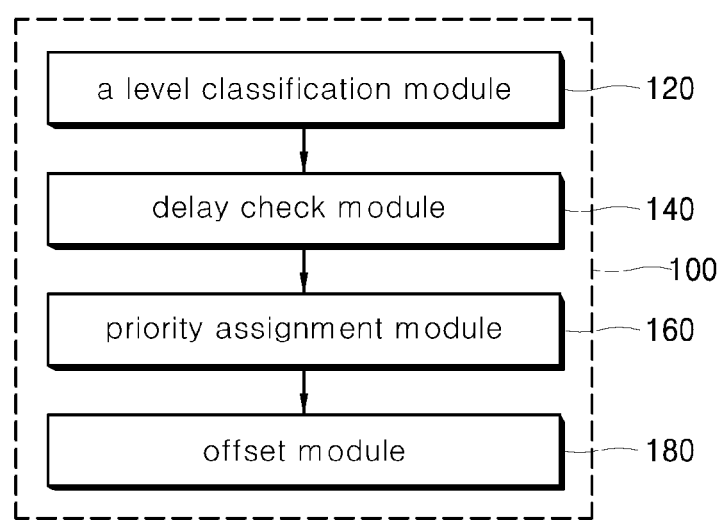
FIG. 1 illustrates a system that controls priority-based contention period channel access for complexity reduction in the WBAN MAC protocol according to the present invention.

<Description of reference numerals for major parts of drawings>

| | |
|---|---|
| 100: coordinator | 120: a level classification module |
| 140: delay check module | 160: priority assignment module |
| 180: offset module | |

BEST MODE

Hereinafter, embodiments of the present invention will be described in detail with reference to the accompanying drawings.

It should be understood that the present invention is not limited to the following embodiments and may be embodied in different ways, and that the embodiments are provided for complete disclosure and thorough understanding of the invention by those skilled in the art. Like components will be denoted by like reference numerals throughout the drawings.

Figure 2:
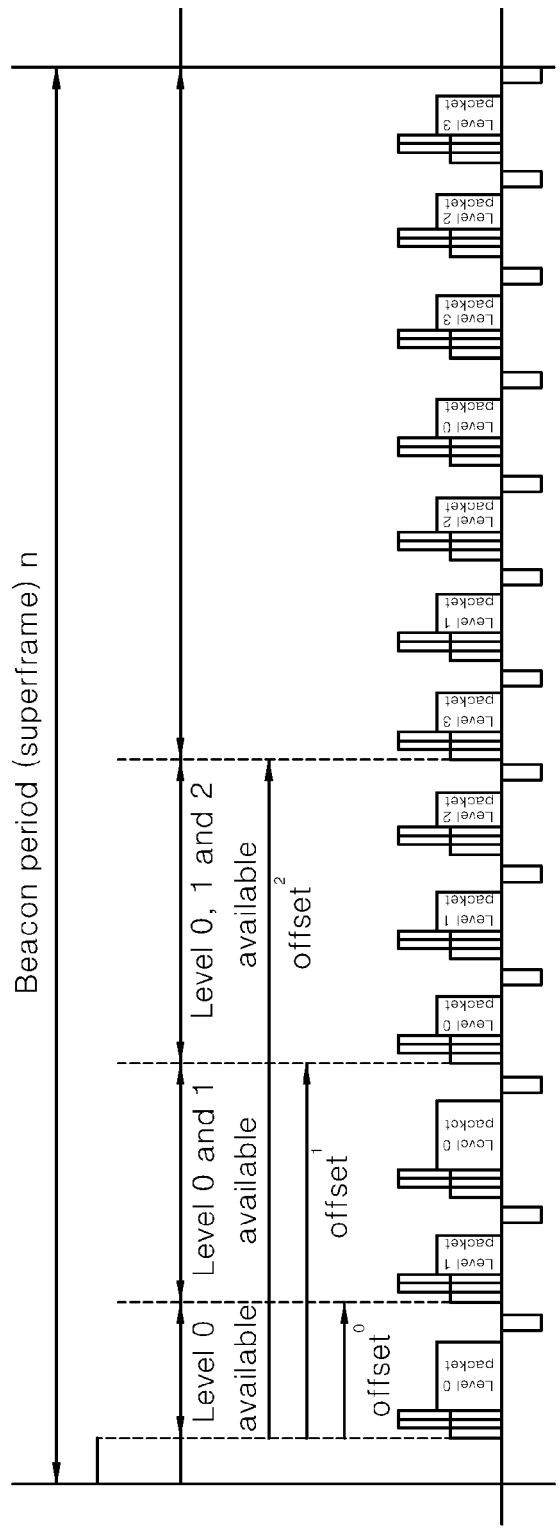
FIG. 2 is an embodiment of the system that controls priority-based contention period channel access for complexity reduction in the WBAN MAC protocol according to the present invention.

FIG. 1 illustrates a system that controls priority-based contention period channel access for complexity reduction in the WBAN MAC protocol according to the present invention, and FIG. 2 is an embodiment of the system that controls priority-based contention period channel access for complexity reduction in the WBAN MAC protocol according to the present invention.

As shown in FIG. 1, the system that controls priority-based contention period channel access for complexity reduction in the WBAN MAC protocol according to the present invention includes a coordinator 100 that classifies packets received from communication devices such as a medical device, mixed medical/CE device and CE device according to the priority level, identifies the delay of packets transmitted in the previous beacon period, and grants transmission priority for the next beacon period to a device having a priority higher than or equal to that of the delayed packet.

The coordinator 100 includes a level classification module 120 to classify priorities of packets, a delay check module 140 to identify transmission delay according to packet transmission times in the previous period, a priority assignment module 160 to assign priorities to packets for channel access at the sub-periods constituting the whole contention period, and an offset module 180 to specify end points of the sub-periods.

The level classification module 120 classifies packets into levels according to the transmission priority of the MAC protocol. Here, the levels correspond to categories of services such as a medical service, general health service, mixed medical/non-medical service with low priority, and non-medical service. In the present embodiment, when medical devices and non-medical devices communicate through the coordinator 100, packets are classified into emergency data, medical data, medical/CE data, and CE data in the MAC protocol. Hence, among packets sent by medical devices, "level 0" is assigned to emergency data, "level 1" is assigned to general medical data, "level 2" is assigned to mixed medical/CE data, and "level 3" is assigned to CE data.

The delay check module 140 checks delay at each beacon period by computing the average delay time for each level $D_{avg}^l$. Here, the average delay time for level 1 ($D_{avg}^l$) is given by Equation 1.

$$D_{avg}^l = \left(\sum_{k=0}^{i} D_k^l\right) / N^l \qquad \text{[Equation 1]}$$

In Equation 1, l indicates the level associated with packet classification, $D_k^l$ indicates delay of each packet with level l, and $N^l$ indicates the number of packets with level l.

To enable the delay check module 140 to check packet transmission delay, it is necessary to define the delay threshold for each level ($\tau^l$), which is a criterion for dividing the whole contention period into sub-periods. As the delay requirements in the WBAN Technical Requirements Document (TRD) specify a maximum transmission delay of 125 ms for medical services and a maximum transmission delay of 250 ms for non-medical services, the delay threshold ($\tau^l$) for level 0, level 1 and level 2 associated with medical services is set to 125 ms and the delay threshold for level 3 associated with non-medical services only is set to 250 ms in the present invention. When the maximum delay requirements in the WBAN TRD are changed, the delay threshold may also be changed accordingly.

To reduce contention complexity, the priority assignment module 160 divides the whole contention period into sub-periods and assigns priority to packets for channel access at each sub-period. That is, each level exceeding the delay threshold ($\tau^l$) is associated with a sub-period, and, at each sub-period, channel access is allowed for the corresponding level and a level having a higher priority than the corresponding level. In addition, the sub-periods are arranged in order of priorities to thereby disperse the number of nodes making channel access attempts at the same time.

The offset module 180 specifies the end point of each sub-period defined by the priority assignment module 160 and represents this as an offset (offset$^l$). The offset for a given level is computed by using the ratio of the number of packets belonging to the given level to the total number of packets received at the previous beacon period and offsets for levels having a higher priority than the given level. The offset (offset$^l$) can be computed using Equation 2 below.

$$offset^l = \sum_{k=0}^{l-1} offset^l + L_{CAP}(N^l / N_{total}) \qquad \text{[Equation 2]}$$

In Equation 2, $L_{CAP}$ denotes the length of the CAP, $N^l$ denotes the number of packets with level l, and $N_{total}$ denotes the total number of packets in the superframe.

FIG. 3 is a pseudo code for the coordinator 100 in the system that controls priority-based contention period channel access for complexity reduction in the WBAN MAC protocol according to the present invention, and FIG. 4 is a pseudo code for a node in the system.

As shown in FIGS. 3 and 4, it is expected that use of the algorithms proposed in the present invention reduces contention complexity and power consumption.

As described above, in the present invention, the contention period is divided into priority-based sub-periods and priorities for channel access are assigned to the individual sub-periods. As such, it is possible to disperse nodes making channel access attempts at the same time, thereby reducing transmission delay, power consumption, and collision ratios. In addition, the present invention may heighten portability of a wireless network employing a contention-based channel access scheme.

Next, a description is given of a simulation based on the system that controls priority-based contention period channel access for complexity reduction in the WBAN MAC protocol according to the present invention with reference to the drawings.

To evaluate performance, the system that controls priority-based contention period channel access for complexity reduction in the WBAN MAC protocol according to the present invention was compared with the IEEE 802.15.4 MAC protocol and the WBAN baseline MAC protocol. The simulator has been implemented using OMNeT++.

For PHY modeling, it is assumed that the ISM band, O-QPSK modulation, a chip rate of 2,000 kcps, and a data rate of 250 kbps are used. Such conditions are identical to those of IEEE 802.15.4. Both of the protocols used for comparison are based on the beacon-enabled non-superframe mode, and BO and SO values determine the superframe length and the active period length, respectively, in order to fairly evaluate and satisfy requirements of WBAN services. BO is set equal to 3 (BO=3), which means that each round is 122.88 ms. The simulation runs 1,000 rounds.

In the traffic model, there are 4 types of medical devices for 12-channel electrocardiography (ECG, 250 Hz), breathing rate (50 Hz), arterial pressure (120 Hz), and respiration rate (20 Hz). These devices periodically send a 40-byte packet. Emergency packets occur randomly, and their packet size is identical to that of normal medical data. In contrast, a CE device sporadically sends a 2500-byte message. The message is divided into MAC layer packets of 127 bytes, which is the maximum size in IEEE 802.15.4.

In the model of network topology, it is assumed that all nodes are randomly deployed within 5 m of the coordinator. It is assumed that the network topology is a star topology and data is transmitted in one hop and all nodes have unlimited battery power. As a single WBAN has only network level mobility, node mobility is assumed not present. Random exponential backoff and contention window values are not prioritized in IEEE 802.15.4. However, both the WBAN baseline MAC protocol and the algorithm of the present invention utilize the priority-based contention window value defined in the IEEE 802.15.6 draft.

Next, a description is given of analysis of simulation results in terms of comparison factors including average delay, collision ratio and power consumption.

Figure 5:
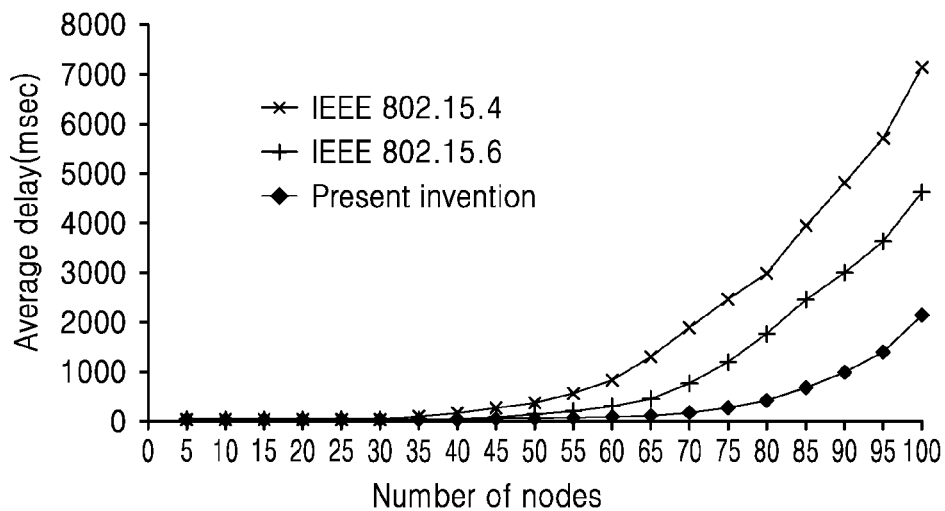
FIG. 5 is a chart of results of comparison in terms of average delay between the system that controls priority-based contention period channel access for complexity reduction in the WBAN MAC protocol according to the present invention, IEEE 802.15.4 and IEEE 802.15.6.

FIG. 5 is a chart of results of comparison in terms of average delay between the system that controls priority-based contention period channel access for complexity reduction in the WBAN MAC protocol according to the present invention, IEEE 802.15.4 and IEEE 802.15.6.

Referring to FIG. 5, the IEEE 802.15.4 MAC protocol operates slotted CSMA/CA without a priority-based channel access policy. Hence, as shown in FIG. 5, the average delay of the IEEE 802.15.4 MAC protocol is largest. On the other hand, as both the proposed algorithm and the IEEE 802.15.6 baseline MAC protocol perform slotted CSMA/CA with a priority-based channel access policy for channel access, they may have a lower average delay than the IEEE 802.15.4 MAC protocol. Meanwhile, the proposed algorithm of the present invention categorizes packets into four priority levels. Since packet categorization can reduce contention complexity, the proposed algorithm exhibits a lower average delay than the IEEE 802.15.6 baseline MAC protocol.

Figure 6:
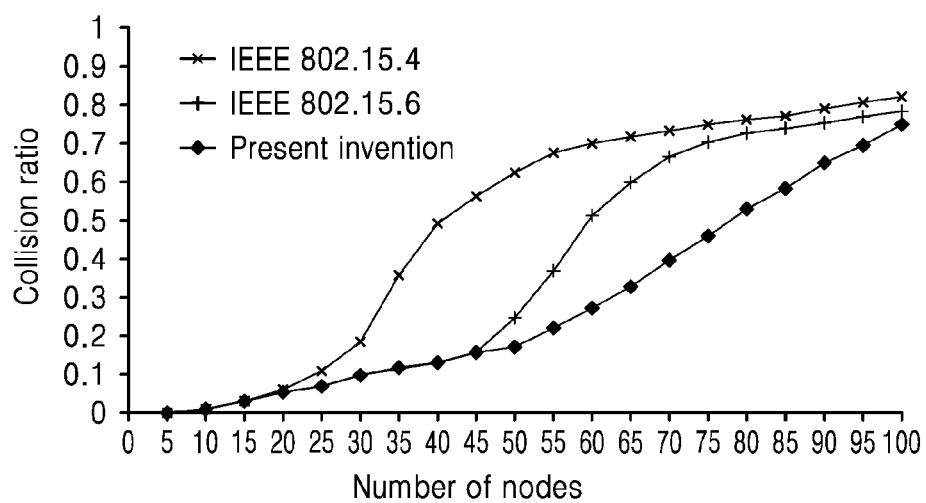
FIG. 6 is a chart of results of comparison in terms of collision ratio between the system that controls priority-based contention period channel access for complexity reduction in the WBAN MAC protocol according to the present invention, IEEE 802.15.4 and IEEE 802.15.6.

FIG. 6 is a chart of results of comparison in terms of collision ratio between the system that controls priority-based contention period channel access for complexity reduction in the WBAN MAC protocol according to the present invention, IEEE 802.15.4 and IEEE 802.15.6.

Referring to FIG. 6, each node contends with the slotted CSMA/CA mechanism. In general, when two or more nodes transmit data at same time, collision occurs. If the network contains a large number of nodes, the number of collisions increases. In the case of the IEEE 802.15.4 MAC protocol, since nodes access the channel without prioritized contention window (CW) policy, a large number of collisions occur. Especially, when the network contains 30 nodes, the collision ratio sharply increases because slotted-CSMA/CA without prioritized policy does not address the contention complexity problem. In the case of the IEEE 802.15.6 baseline MAC protocol and the proposed algorithm, the number of collisions is less than that of IEEE 802.15.4 because of prioritized clear channel assessment (CCA) and random backoff. However, the IEEE 802.15.6 baseline MAC protocol cannot handle the problem of high contention complexity. When the network contains 50 nodes, the collision ratio sharply increases similarly to the case of the IEEE 802.15.4 MAC protocol. However, the proposed algorithm of the present invention exhibits a low collision ratio because channel access based on priority-based categorization can disperse channel complexity and reduce the number of collisions.

Figure 7:
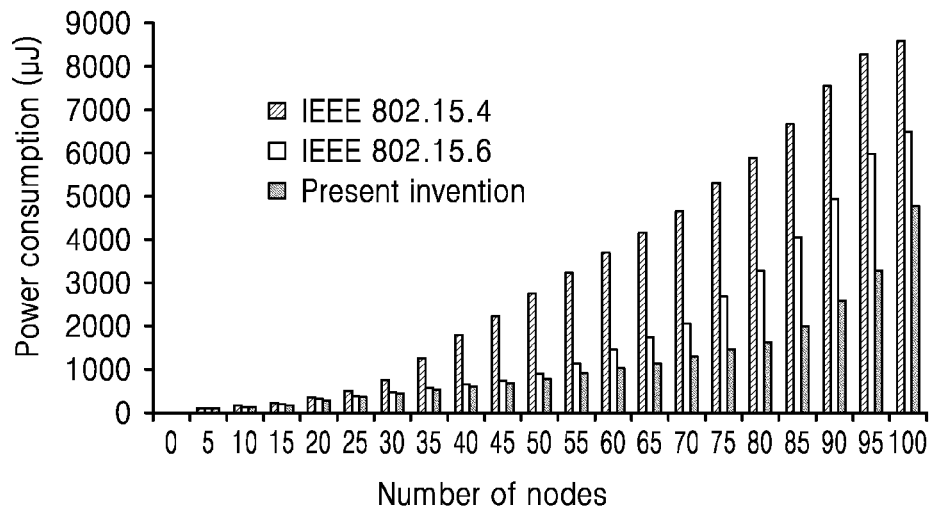
FIG. 7 is a chart of results of comparison in terms of power consumption between the system that controls priority-based contention period channel access for complexity reduction in the WBAN MAC protocol according to the present invention, IEEE 802.15.4 and IEEE 802.15.6.

FIG. 7 is a chart of results of comparison in terms of power consumption between the system that controls priority-based contention period channel access for complexity reduction in the WBAN MAC protocol according to the present invention, IEEE 802.15.4 and IEEE 802.15.6.

Referring to FIG. 7, in general, collision and retransmission cause power consumption to increase. The IEEE 802.15.4 protocol exhibits high power consumption because all nodes operate under the same conditions for contention such as contention window and backoff exponential value. Moreover, high contention complexity causes the number of nodes colliding at the same time to increase and thus generates a large number of retransmissions. Hence, power consumption of the IEEE 802.15.4 MAC protocol sharply increases. On the other hand, the IEEE 802.15.6 baseline MAC protocol and the proposed algorithm consume less power. These results are due to the fact that the IEEE 802.15.6 baseline MAC protocol and the proposed algorithm utilize prioritized channel access along with differentiated contention window and exponential backoff values. Moreover, the proposed algorithm of the present invention can disperse channel complexity and reduce contention complexity, causing reduction in the number of collisions and retransmissions. Consequently, the proposed algorithm of the present invention consumes less power in comparison to the IEEE 802.15.4 MAC protocol and the IEEE 802.15.6 baseline MAC protocol.

Next, a description is given of a method that controls priority-based contention period channel access for complexity reduction in the WBAN MAC protocol according to the present invention with reference to the drawings. Some parts of the following description may be the same as those of the above description of the system that controls priority-based contention period channel access for complexity reduction in the WBAN MAC protocol according to the present invention, and a description thereof will be simplified or omitted.

Figure 8:
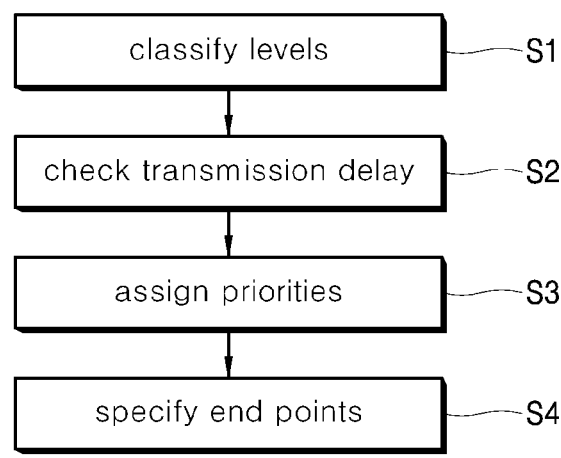
FIG. 8 is a flowchart of a method that controls priority-based contention period channel access for complexity reduction in the WBAN MAC protocol according to the present invention.

FIG. 8 is a flowchart of a method that controls priority-based contention period channel access for complexity reduction in the WBAN MAC protocol according to the present invention.

As shown in FIG. 8, the method that controls priority-based contention period channel access for complexity reduction in the WBAN MAC protocol according to the present invention includes: classifying levels (step S1), checking packet transmission delay (step S2), assigning priorities to packets (step S3), and specifying end points of sub-periods (step S4).

At step S1 for level classification, the level classification module of the coordinator classifies packets into levels according to their priority in the MAC protocol. As described before in connection with the system that controls priority-based contention period channel access for complexity reduction in the WBAN MAC protocol according to the present invention, "level 0" may be assigned to emergency data, "level 1" may be assigned to general medical data, "level 2" may be assigned to mixed medical/CE data, and "level 3" may be assigned to CE data.

At step S2 for checking packet transmission delay, the delay check module of the coordinator checks delay at each beacon period by computing the average delay time for each level $D_{avg}^l$. The average delay time for level 1 is given by Equation 1. Additionally, to check delay, the delay check module defines the delay threshold for each level ($\tau^l$). As described before, the delay threshold ($\tau^l$) for level 0, level 1 and level 2 associated with medical services is set to 125 ms and the delay threshold for level 3 associated with non-medical services only is set to 250 ms.

At step S3 for packet priority assignment, the priority assignment module of the coordinator divides the whole contention period into sub-periods and assigns priority to packets for channel access at each sub-period. Here, each level exceeding the delay threshold ($\tau^l$) has transmission preference at the next sub-period, and, at a given sub-period, channel access is allowed for the given level and a level having a higher priority than the given level. That is, a packet with a level exceeding the delay threshold has transmission preference at the next sub-period in order of levels.

At step S4 for specifying end points of sub-periods, the offset module 180 of the coordinator specifies the end point of each sub-period defined by the priority assignment module. The end point of a sub-period is indicated by an offset (offset$^l$) that is given by Equation 2.

Hereinabove, some embodiments have been described with reference to the drawings. It should be understood by those skilled in the art that various modifications and changes can be made without departing from the spirit and scope of the present invention as defined in the appended claims and their equivalents.

INDUSTRIAL APPLICABILITY

The present invention divides the contention period into priority-based sub-periods and assigns priorities for channel access to the individual sub-periods. As such, it is possible to disperse nodes making channel access attempts at the same time, thereby reducing transmission delay, power consumption, and collision ratios. The present invention may also heighten portability of a wireless network employing a contention-based channel access scheme.

The invention claimed is:

1. A system for controlling channel access in a priority-based contention period to reduce complexity in a Wireless Body Area Network (WBAN) MAC protocol performing contention-based communication using beacons, wherein the system comprises:
a coordinator that:
classifies packets received from communication devices according to priority levels,
identifies delayed packets transmitted in a previous beacon period, and
grants transmission priority for a next beacon period to packets transmitted from at least one of the communication devices having priority levels higher than or equal to the priority levels of the delayed packets;
the coordinator comprising:
a level classification module to classify priorities of packets;
a delay check module to identify packet transmission delay in the previous beacon period;
a priority assignment module to assign priorities to packets for channel access at individual sub-periods constituting a whole contention access period (CAP); and
an offset module to specify end points of the sub-periods;
wherein the packets include emergency packets, medical packets, medical/CE packets and CE packets, wherein emergency packets are classified as level 0 by the level classification module, medical packets are classified as level 1, medical/CE packets are classified as level 2, and CE packets are classified as level 3, and wherein level 0 has a higher priority than level 1, level 1 has a higher priority than level 2, and level 2 has a higher priority than level 3; and
wherein the delay check module checks packet delay by computing an average delay time for packets with level 1 ($D_{avg}^l$), and wherein the average delay time is given by $$D_{avg}^l = \left(\sum_{k=0}^{i} D_k^l\right) / N^l$$

where l denotes the level of packets, $D_k^l$ denotes delay of each packet, and $N^l$ denotes the number of packets with level l.

2. The system according to claim 1, wherein the delay check module examines transmission delay by comparing the average delay time with a delay threshold for a given level ($\tau^l$), and wherein the delay threshold for level 0, level 1 and level 2 is 125 milliseconds (ms) and the delay threshold for level 3 is 250 ms.

3. The system according to claim 1, wherein the priority assignment module assigns priority so that a sub-period is allocated first to a packet with a level exceeding a delay threshold ($\tau^l$) wherein, at a given sub-period, channel access is allowed only for the level corresponding to the given sub-period and a level having a higher priority than the corresponding level, and wherein the sub-periods are arranged in order of priorities.

4. The system according to claim 3, wherein the offset module specifies the end point of each sub-period defined by the priority assignment module by computing an offset for level 1 (offset$^l$), and wherein the offset is given by $$\text{offset}^l = \sum_{k=0}^{l-1} \text{offset}^l + L_{CAP}(N^l / N_{total})$$

where $L_{CAP}$ denotes a length of the CAP, $N^l$ denotes a number of packets with level l, and $N_{total}$ denotes a total number of packets in a superframe.

5. A method for controlling channel access in a priority-based contention period to reduce complexity in a Wireless Body Area Network (WBAN) MAC protocol, the method comprising:

classifying, by a level classification module of a coordinator, packets into levels according to their priority;

checking, by a delay check module of the coordinator, packet transmission delay by computing an average delay time for delayed packets of each level at each beacon period;

dividing, by a priority assignment module of the coordinator, a whole contention access period (CAP) into sub-periods and giving transmission preference at a sub-period of a next beacon period to packets with a level exceeding the levels of delayed packets; and specifying, by an offset module of the coordinator, an end point of each sub-period defined by the priority assignment module;

wherein the packets include emergency packets, medical packets, medical/CE packets and CE packets, wherein emergency packets are classified as level 0 by the level classification module, medical packets are classified as level 1, medical/CE packets are classified as level 2, and CE packets are classified as level 3, and wherein level 0 has a higher priority than level 1, level 1 has a higher priority than level 2, and level 2 has a higher priority than level 3; and wherein the average delay time for level 1 ($D_{avg}^l$) is given by $$D_{avg}^l = \left(\sum_{k=0}^{i} D_k^l\right) / N^l$$

where l denotes the level of packets, $D_k^l$ denotes delay of each packet, and $N^l$ denotes a number of packets with level l.

6. The method according to claim 5, wherein checking packet transmission delay comprises comparing, by the delay check module, the average delay time with a delay threshold for a given level ($\tau^l$) to examine packet transmission delay, and wherein the delay threshold for level 0, level 1 and level 2 is 125 milliseconds (ms) and the delay threshold for level 3 is 250 ms.

7. The method according to claim 5, wherein, in dividing the whole contention access period into sub-periods and giving transmission preference, the priority assignment module assigns priority so that a sub-period is allocated first to a packet with a level exceeding delay threshold ($\tau^l$), wherein, at a given sub-period, channel access is allowed only for the level corresponding to the given sub-period and a level having a higher priority than the corresponding level, and wherein the sub-periods are arranged in order of priority.

8. The method according to claim 7, wherein, in specifying the end point of each sub-period, the offset module specifies the end point of each sub-period defined by the priority assignment module by computing an offset for level 1 ($offset^l$), and wherein the offset is given by $$offset^l = \sum_{k=0}^{l-1} offset^k + L_{CAP}(N^l / N_{total})$$

where $L_{CAP}$ denotes the length of the CAP, $N^l$ denotes a number of packets with level $N_{total}$ and denotes a total number of packets in a superframe.

* * * * *